United States Patent [19]
Duncan

[11] Patent Number: 6,024,262
[45] Date of Patent: Feb. 15, 2000

[54] EQUIPMENT MOUNTING RACK

[75] Inventor: Edwin L. Duncan, Fredericksburg, Va.

[73] Assignee: The United States of America as represented by the Secretary of the Army, Washington, D.C.

[21] Appl. No.: 09/107,140

[22] Filed: Jun. 30, 1998

[51] Int. Cl.[7] ...................................................... B60R 7/04
[52] U.S. Cl. .......................... 224/311; 224/548; 224/554; 224/558; 224/929; 250/330; 280/769; 348/148; 348/164
[58] Field of Search ...................................... 224/309, 311, 224/314, 319, 929, 482, 539, 542, 545, 548, 550, 553, 554, 555, 558; 250/330; 348/148, 164; 280/769, 756; 248/200.1

[56] References Cited

U.S. PATENT DOCUMENTS

| | | |
|---|---|---|
| 2,716,193 | 8/1955 | Riolo .......................................... 250/330 |
| 4,089,542 | 5/1978 | Westerman ........................... 280/756 X |
| 5,005,213 | 4/1991 | Hanson et al. ....................... 348/148 X |
| 5,292,045 | 3/1994 | Mandel .................................... 224/309 |
| 5,414,439 | 5/1995 | Groves et al. ....................... 250/330 X |
| 5,619,036 | 4/1997 | Salvio et al. ............................ 250/330 |

FOREIGN PATENT DOCUMENTS

3915359 A1  11/1990  Germany ................................ 224/309

*Primary Examiner*—Gregory M. Vidovich
*Attorney, Agent, or Firm*—Milton W. Lee; John E. Holford; Alain L. Bashore

[57] ABSTRACT

A releasably mounted equipment rack mounted to a roll bar and windshield frame of a vehicle, allowing a viewing device to be mounted for viewing by a front seat occupant of a soft top vehicle.

7 Claims, 4 Drawing Sheets

EQUIPMENT MOUNTING RACK

BACKGROUND OF THE INVENTION

1. Field of the Invention

The present invention generally relates to equipment mountings and more specifically, to a releasably mounted equipment rack for mounting to the roll bar and windshield frame of a vehicular interior.

2. Description of Prior Art

An equipment mounting system must provide adequate physical support for the equipment utilized while also providing the equipment in an accessible position to the user. When the equipment is to be utilized in a vehicle, the space available for use is quite confined and difficult to identify. The use of such equipment by front seat occupants particularly the driver, must not allow the front outward viewing to be hampered. An added complication occurs when the vehicle does not include a rigid vehicular top for supporting such equipment.

Viewing equipment such as the U.S. Army's night vision driver's viewers including the currently fielded AN/VAS-5 drivers vision enhancer which allow for vehicular drivers to navigate in severely reduced light or total darkness. A remote driver's viewer allows all controls and viewing output to be contained within a vehicle's interior while the sensor is placed outside of a vehicular hatch opening cover. With the advent of the "soft top" high mobility multi-purpose wheeled vehicle (HMMWV), the use of hatch openings and other associated roof structures are no longer available for mounting use.

While the prior art has reported using equipment mountings none have established a basis for a specific device that is dedicated to the task of resolving the particular problem at hand. What is needed in this instance is a releasably mounted equipment rack mounted to the roll bar and windshield frame of a vehicular interior of a soft top vehicle.

SUMMARY OF THE INVENTION

It is therefore one object of the invention to provide a releasably mounted equipment rack mounted to the roll bar and windshield frame of a vehicular interior of a soft top vehicle.

According to the invention, there is disclosed an equipment mounting rack device releasably mounted to a roll bar and windshield frame of a vehicle, allowing a viewing device to be mounted for viewing by a front seat occupant of a soft top vehicle. The two rack mounting members, which are L-shaped angle bars, are substantially parallel to each other as L-shaped angle bars with first and second ends. Means for mounting a viewing device is located on each of said rack mounting members. A windshield clamp subassembly releasably couples the equipment mounting rack device to a windshield frame of a vehicle. A roll bar clamp subassembly releasably coupling the equipment mounting rack device to a roll bar of a vehicle. The equipment mounting device with loosened flange bolts is located within the vehicle interior near the windshield frame and roll bar, and the windshield frame clamp subassembly and the roll bar clamp subassembly are abutted up to and slid about each of the windshield frame and roll bar respectively. All flange bolts are tightened to secure the equipment mounting rack device between the windshield frame and roll bar for releasably mounting the viewing device to said means for mounting a viewing device. A viewing device can then be suspended downward from the equipment rack mounting for viewablity by a front seat occupant. In the preferred embodiment the viewing device is a remote driver's viewer, and the vehicle is a soft top high mobility multi-purpose wheeled vehicle.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
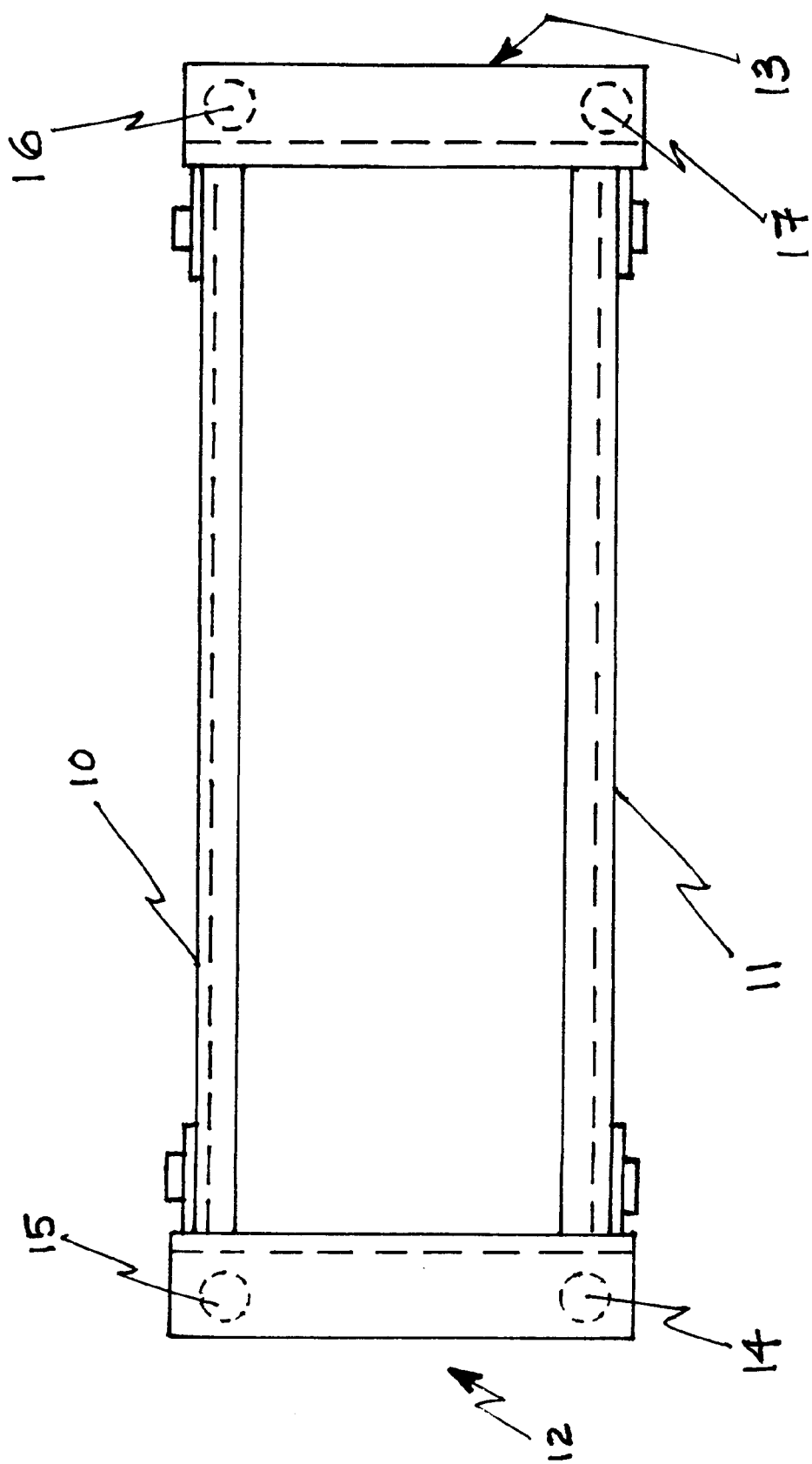
FIG. 1 is a top view of the equipment mounting rack of the invention across a roll bar and windshield frame.
Figure 2:
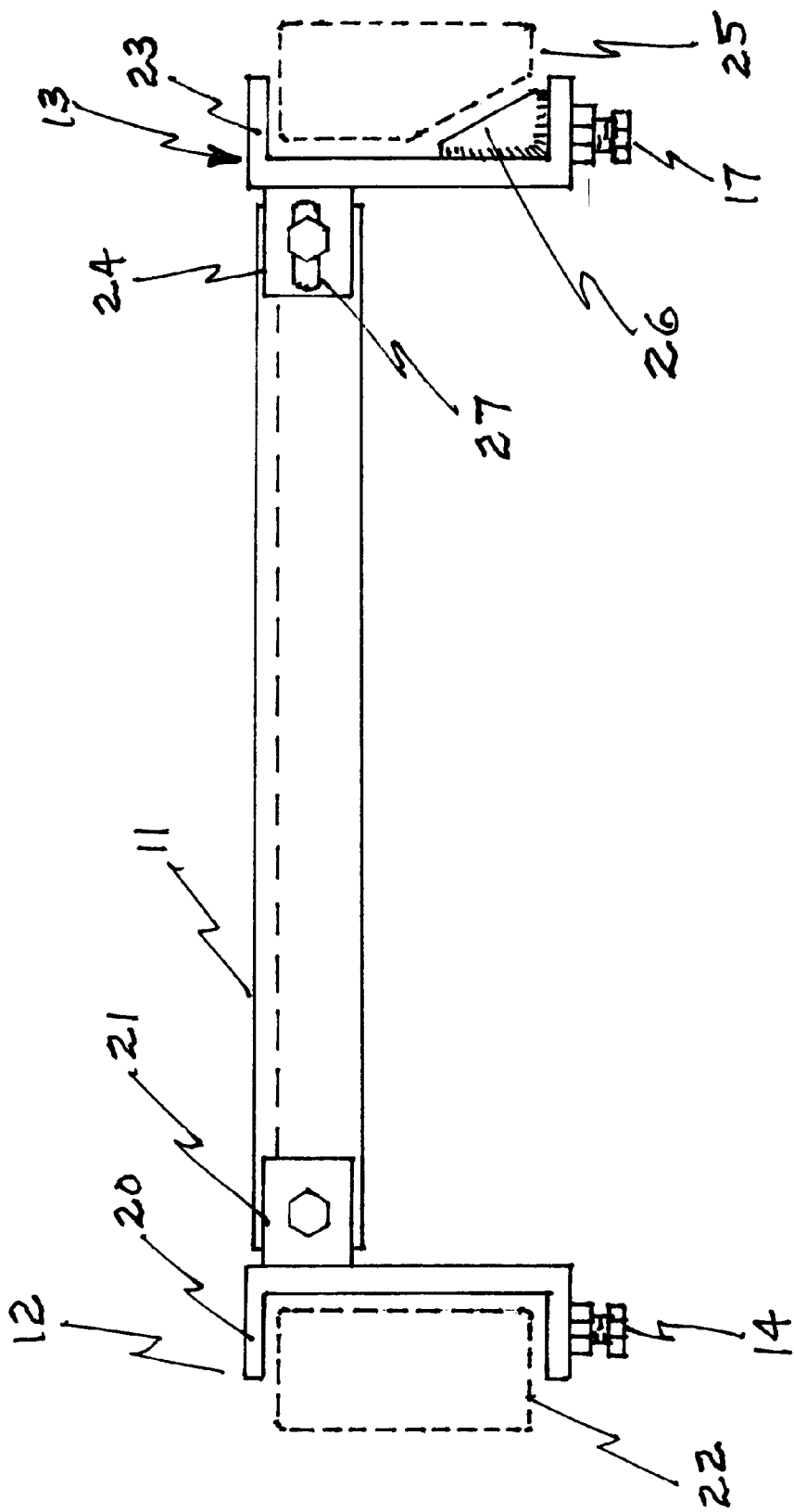
FIG. 2 is a side view of FIG. 1.

Referring now to the drawings, and more particularly to FIGS. 1 and 2, there is shown the top and side views respectively of the equipment mounting rack of the invention. Rack mounting members 10 and 11 are substantially parallel to each other and are also coupled perpendicularly at each respective ends with flange bolts to windshield clamp subassembly 12 and roll bar clamp subassembly 13 as shown in FIG. 1. Rack mounting members 10 and 11 are L-shaped angle bars. Set screws 14, 15, and set screws 16, 17, are positioned at each of windshield clamp subassembly 12 and roll bar clamp subassembly 13 respectively for releasable coupling of the invention to the windshield frame and roll bar of a vehicle.

Windshield clamp subassembly 12, shown in FIG. 2, includes clamp 20 with set screws 14 and 15 (set screw 14 shown in FIG. 2) protruding through a bottom portion shown, and two flanges (flange 21 shown in FIG. 2) protruding from an outward portion of clamp 20 for coupling of roll bar clamp subassembly 12 to rack mounting members 10 and 11 (rack mounting member 11 shown in FIG. 2). Windshield subassembly 12 allows for releasable coupling of the device of the present invention to windshield frame 22 shown in phantom. Roll bar clamp subassembly 13 includes clamp 23 with set screws 17 and 16 protruding through a bottom portion shown, and two flanges (flange 24 shown in FIG. 2) protruding through an outward portion of clamp 23 for coupling of windshield clamp subassembly 13 to rack mounting members 10 and 11. Roll bar clamp subassembly 13 allows for releasable coupling of the device of the present invention to roll bar 25 shown in phantom. Contour element 26 is optionally positioned within clamp 23 to fully allow clamping about an irregular shaped roll bar such as shown in FIG. 2. Such a contour element may also be utilized for the windshield frame if needed.

The equipment mounting rack device as described is positioned with loosened flange bolts within the vehicle interior near the windshield frame and roll bar. The windshield frame clamp subassembly and the roll bar clamp subassembly are abutted up to and slid about each of the windshield frame and roll bar respectively. The roll bar clamp subassembly may be moved further against the roll bar, if needed, by movement along slots located in each of the two flanges (slot 27 shown in phantom in FIG. 2). Once the equipment mounting device is appropriately placed all flange bolts are tightened to secure the equipment mounting rack device between the windshield frame and roll bar. The equipment rack mounting would specifically be dimensioned to allow a viewing device to be releasably mounted thereto.

Figure 3:
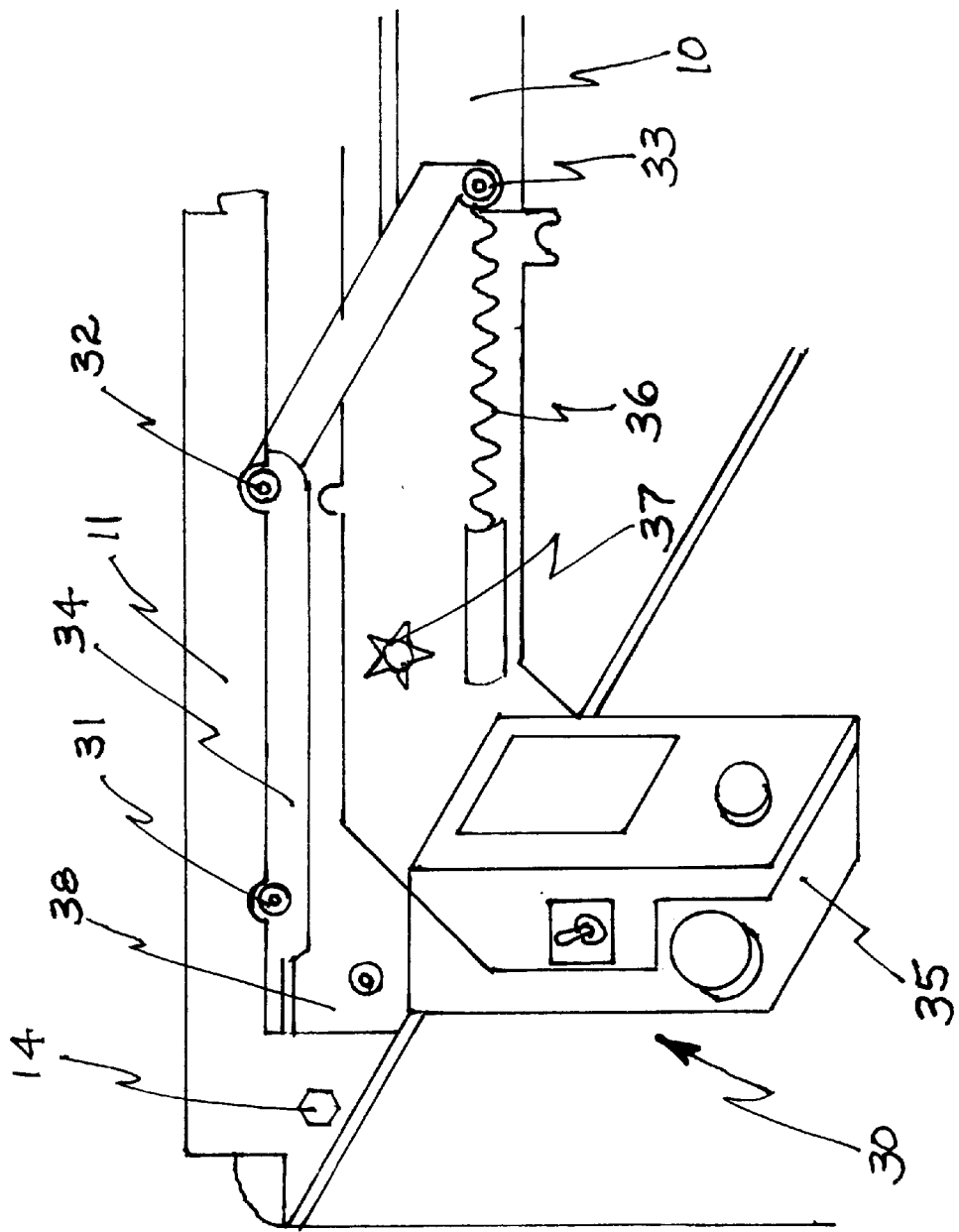
FIG. 3 is a pictorial view of a remote driver's viewer releasably attached to the equipment mounting rack shown from a vehicular interior of a HMMWV as the preferred embodiment.

FIG. 3 is a pictorial view, as the preferred embodiment, of remote driver's viewer assembly 30 (currently fielded as the AN/VAS-5 drivers vision enhancer) allows for movable attachment to the equipment rack mounting shown within a vehicular interior of a HMMWV with soft cover top in place. Circular grooves 31, 32 are cut in rack mounting member 11 and two circular grooves (only groove 33 is shown in FIG. 3) are cut in rack mounting member 10. The circular grooves as shown allow support pins that protrude about installation element 34 to be recessed so that installation element 34 can be attached via screws (shown in FIG. 4 as 40, 41, 42 and 43) firmly to rack mounting members 10 and 11. Viewing element 35 including flange 38 is then suspended about the support pins of installation 34 along two tracks (track 36 shown in FIG. 3) and the operator can move viewing element 35 along the tracks to a desired position. Screw knob 37 is then tightened to firmly position viewing element 35 against installation element 34 along any of desired hole positions (shown in FIG. 4, as holes 44).

Figure 4:
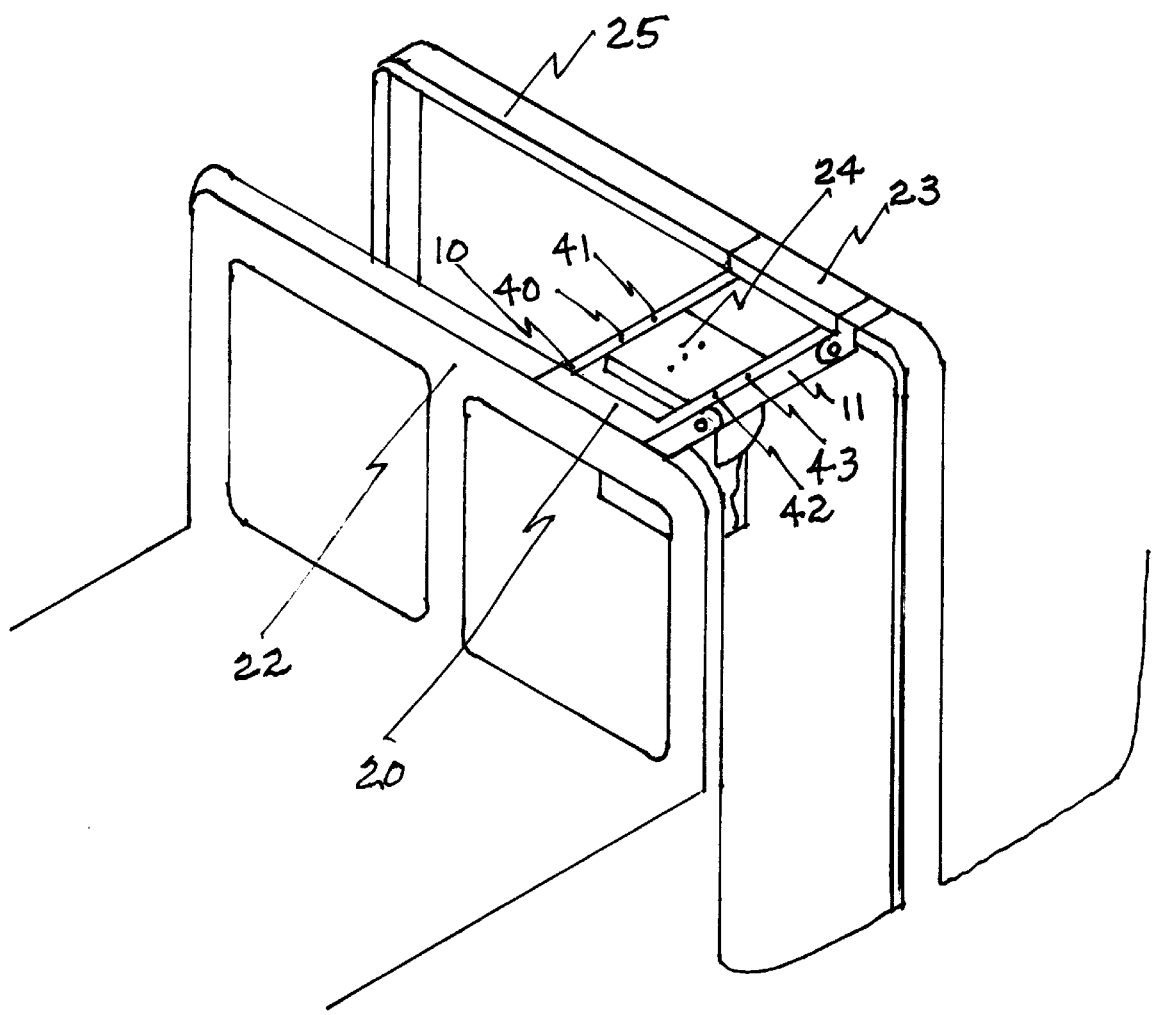
FIG. 4 is a pictorial view of FIG. 3 as shown from the partial vehicular exterior of a HMMWV without the soft top cover in place.

In the preferred embodiment the equipment mounting rack device is made of Al sheet metal. Rack mounting members are each 28.375 in. long, with edge circular grooves of 0.375 in. radius. The rack mounting members also include a 0.375 in. movement slot at one end for adjustable movement (both lateral and rotational) of the roll bar clamp subassembly during positioning of the roll bar clamp subassembly to the roll bar. A 0.375 in. hole is positioned at the other end of each rack mounting member for adjustable rotational movement of the windshield clamp subassembly during positioning of the windshield clamp subassembly to the windshield frame. The windshield clamp assembly and roll bar clamp assembly both are C-clamp shaped with heights of 4.0 in. and include flanges that are 1.00 inch radius from a center hole in each flange. Clamp depth is 2.000 in. and 2.181 in. for the windshield clamp assembly and roll bar clamp assembly respectively. Flange spacing is 13.875 in. and 13.937 in. for the windshield clamp assembly and roll bar clamp assembly respectively. The set screws utilized in the preferred embodiment are 10 –32 set screws. The contour element are two 65 degree triangle flanges each with a 2.0 in. hypotenuse positioned within the roll bar clamp. FIG. 4 is a pictorial view of FIG. 3 as shown from the partial vehicular exterior of a HMMWV without the soft top cover in place. As seen in FIG. 4, the equipment mounting rack device is located on the drivers side to allow use of the driver's viewer monitor 30 by a driver. Holes 40, 41, 42, and 43 is where screw attachment (from below) of installation element 34 to rack mounting members 10 and 11 occur. Any of holes 44 (shown in FIG. 4 may be the attachment site (from below) for screw knob 37 of FIG. 3.

While this invention has been described in terms of a preferred embodiment, those skilled in the art will recognize that the invention can be practiced with modification within the spirit and scope of the appended claims.

Having thus described my invention, what I claim as new and desire to secure by Letters Patent is as follows:

1. A releasably mounted equipment rack for mounting to the roll bar and windshield frame of a vehicular interior, allowing a viewing device to be mounted for viewing by a front seat occupant, the device comprising:

two rack mounting members, substantially parallel to each other, for releasably mounting a viewing device, each rack mounting member including an L-shaped angle bar with first and second ends;

a viewing device, said viewing device adjustably mounted onto each of said rack mounting members;

a windshield clamp subassembly, substantially perpendicular and rotatively coupled to said first ends for releasably coupling the releasably mounted equipment rack to a windshield frame of a vehicle, said windshield clamp subassembly including a C-shaped clamp with first bottom, side and top surfaces, said first bottom surface including two set screws communicating therethrough, the windshield clamp assembly further including two flanges outwardly protruding from said first side surface for said rotatively coupling to said first ends by respective flange bolts;

a roll bar clamp subassembly, substantially perpendicular and rotatively coupled to said second ends for releasably coupling the releasably mounted equipment rack to a roll bar of the vehicle, said roll bar clamp subassembly including a C-shaped clamp with second bottom, side and top surfaces, said second bottom surface including two set screws communicating therethrough, the roll bar clamp assembly further including two flanges outwardly protruding from said second side surface for said rotatively coupling to said second ends by respective flange bolts, whereby the releasably mounted rack mounting members are located within the vehicle interior near the windshield frame and roll bar, and the windshield frame clamp subassembly and the roll bar clamp subassembly are abutted up to and slid about each of the windshield frame and roll bar respectively such that the flange bolts are tightened to secure the equipment mounting rack device between the windshield frame and roll bar for mounting the equipment rack so that the viewing device is suspended downward from the equipment rack mounting members for viewablity by a front seat occupant.

2. The equipment mounting rack device of claim 1 wherein said viewing device is a model AN/VAS-5 driver's vision enhancer.

3. The equipment mounting rack device of claim 1 wherein said vehicle is a soft top high mobility multipurpose wheeled vehicle.

4. The equipment mounting rack device of claim 1 wherein said roll bar clamp subassembly further includes a contour element within the C-shaped clamp.

5. A technique for mounting a releasably mounted equipment rack to the roll bar and windshield frame of a vehicular interior thereby allowing a viewing device to be mounted for viewing by a front seat occupant, the technique comprising:

providing two rack mounting members for releasably mounting a means for mounting a viewing device;

providing a windshield clamp subassembly for releasably coupling the rack mounting members to a windshield frame of a vehicle;

providing a roll bar clamp subassembly for releasably coupling the rack mounting members to a roll bar of a vehicle;

providing a viewing device adjustably mounted onto each of said rack mounting members, whereby the rack mounting members are located within the vehicle interior near the windshield frame and roll bar, and the windshield frame clamp subassembly and the roll bar clamp subassembly are abutted up to and slid about each of the windshield frame and roll bar respectively such that the respective clamp subassemblies are tightened to secure the equipment mounting rack device between the windshield frame and roll bar for mounting the equipment rack so that the viewing device is suspended downward from the equipment rack mounting members for viewablity by a front seat occupant.

6. The technique for mounting a releasably mounted equipment rack of claim 5 wherein said providing a viewing device is providing a model AN/VAS-5 driver's vision enhancer.

7. The technique for mounting a releasably mounted equipment rack of claim 5 wherein said technique further includes providing a contour element within the roll bar clamp subassembly for added adaptabilty for releasable coupling of said roll bar subassembly to said roll bar.

* * * * *